Oct. 11, 1927.

J. A. BURNS 1,645,276

ADJUSTABLE NUT

Filed Feb. 16, 1922

WITNESSES:
A.G. Schiefelbein
W.B. Jaspert

INVENTOR
James A. Burns,
BY
Wesley G. Carr
ATTORNEY

Patented Oct. 11, 1927.

1,645,276

UNITED STATES PATENT OFFICE.

JAMES A. BURNS, OF WILKINSBURG, PENNSYLVANIA, ASSIGNOR TO WESTINGHOUSE ELECTRIC & MANUFACTURING COMPANY, A CORPORATION OF PENNSYLVANIA.

ADJUSTABLE NUT.

Application filed February 16, 1922. Serial No. 536,947.

My invention relates to machine tools, more especially to screw-shaft members which are commonly employed to impart movements to the various working parts.

It is among the objects of this invention to provide a screw-and-nut mechanism in which the nut member shall be adapted to be adjusted relative to the screw threads.

It is a further object of this invention to provide a structure of the above designated type which shall be of simple construction and may be readily manipulated to provide the necessary adjustment required.

The standard screw shaft of machine tools is provided with a threaded outer surface which is adapted to rotate in a correspondingly threaded recess of what is commonly known as a nut member. The threaded surfaces are of various proportions, depending upon their use or function, but the work-screw of a machine tool is commonly provided with a flat thread, known as the "acme" screw-thread, which permits of considerable wear within certain strength limits.

A screw-and-nut mechanism is usually designed with the object of securing minimum wear. For this reason, unlike materials, such as bronze and steel, are employed as it is well known that the erosion of unlike materials will be less than that of similar materials.

The most common practice is to employ a steel screw-shaft and a brass or bronze nut. This is done for two reasons: the steel shaft is relatively long in proportion to the nut member and since it requires considerably more machining, it is made of the more durable material; whereas, the nut member having the lesser threaded portion is made of a material which does not cut the steel and, therefore, wears more rapidly and is the more frequently renewed.

For some applications in which the screw member is in active use continuously, the wear is so great that frequent renewals of the nut members are necessary and my present invention is designed to provide an adjustable nut comprising a plurality of parts which may be adjusted to take up the wear on the screw thread to rigidly support the screw shaft in operation.

Figure 1:
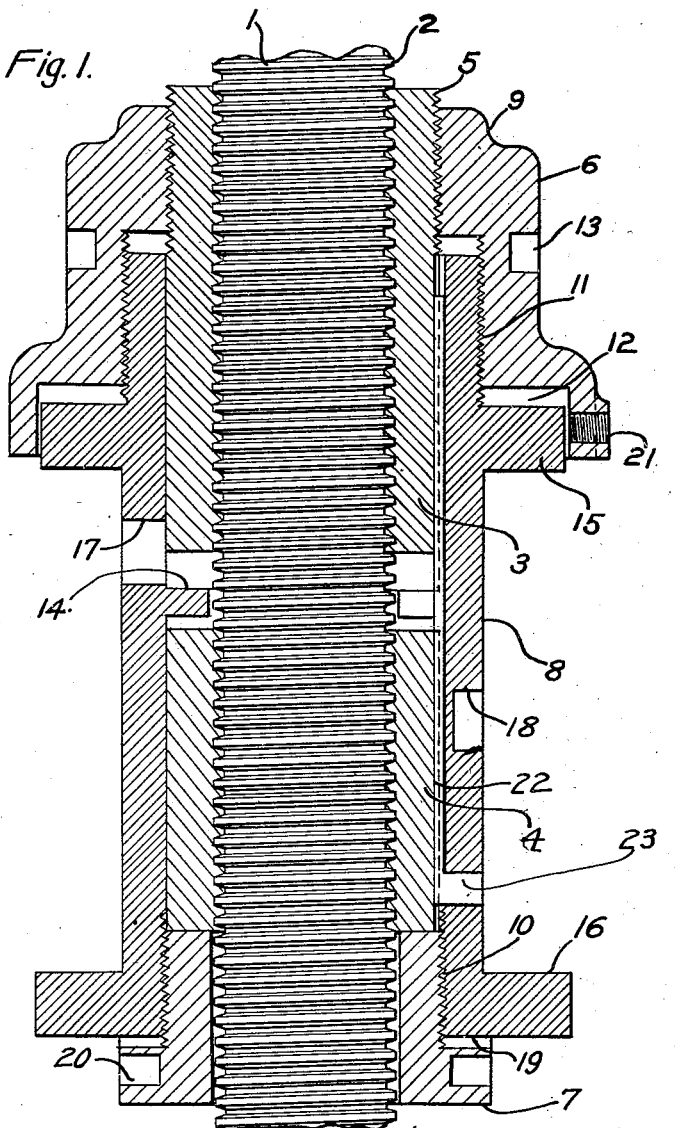
Figure 2:
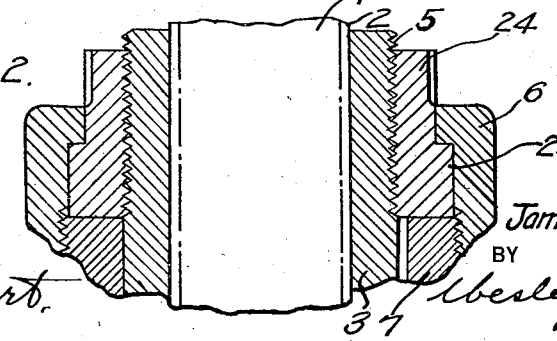

In the accompanying drawings, constituting a part hereof, and in which like reference characters designate like parts, Figure 1 is a cross-sectional view of a screw-and-nut mechanism made in accordance with my invention, and Fig. 2 is a fragmentary view of the upper portion of the nut member having a lock ring mounted therein.

A screw shaft 1 having a threaded outer surface 2 may be rotatably mounted at its ends and driven in any suitable manner, as by a gear or pulley drive (not shown). An adjusting member consisting of a plurality of threaded nuts 3 and 4 having their inner surfaces threaded to correspond to the thread 2 of the screw shaft and provided with threads 5 on the outer surfaces thereof are screwed onto the shaft 1. A plurality of threaded adjusting sleeves 6 and 7 and a sleeve support 8 having threaded surfaces 9, 10 and 11 are fitted in their proper positions on the nuts 3 and 4. The threads 5 and 11 of the members 3 and 8, respectively, are of different pitch as are the threads of the sleeve 6 with which they interact to effect relative movement of the members for adjustment, as will be hereinafter set forth.

The adjusting sleeve 6 is provided with an annular recess 12 and a plurality of radially drilled holes 13 adapted to receive correspondingly shaped lugs of a spanner-wrench. The sleeve support 8 is provided with a central projecting flange 14 which maintains separation of the threaded nuts 3 and 4 and exterior flanges 15 and 16 adapted to fit in a supporting journal bracket (not shown). It is further provided with an opening 17 communicating with the screw 1, through which the screw and nut members are lubricated, and a radial recess 18 which is adapted to receive a projection of a support (not shown) to prevent rotation thereof. The adjusting sleeve 7 is provided with a seating flange 19 and radial recesses 20 adapted to receive a spanner wrench. The depending flange of the adjusting sleeve 6 is provided with a threaded opening 21 adapted to receive a set screw for locking the sleeve 6 relative to the sleeve support 8.

The nuts 3 and 4 are provided with key-seats 22 adapted to engage a correspondingly shaped key fitted in the sleeve support 8. The key is provided with a gib which is fitted in the opening 23 to secure the key and prevent sliding thereof.

In the modification shown in Fig. 2, an adjustable ring nut 24 provided with a seating flange 25 for engaging sleeve support 8 is screwed on the nut 3. Member 6 acts as a locking nut to retain nut 24 in its adjusted position.

Adjustment of the nut member is made as follows:

The screw nuts 3 and 4 are fitted to the screw shaft 1, in spaced relation to provide clearance for adjustment between their proximate ends and the projecting flange 14 of the sleeve support 8.

The adjusting sleeve 6 is screwed onto the nut 3 and sleeve support 8, and the adjusting sleeve 7, spaced from the screw 1, is fitted into the threaded portion 10 of the sleeve support 8. The nut 4 projects a considerable distance beyond the threaded portion 10 of the sleeve support 8 and the adjusting sleeve 7 is screwed down to seat against the projected face thereof, thus permitting the nut 4 to be moved relative to the sleeve support 8, and the nut 3 is similarly secured to the sleeve support 8 through the adjusting sleeve 6. The nuts 3 and 4 may be moved in either direction by turning the adjusting sleeves 6 and 7 within and upon the sleeve support 8, respectively, thereby causing them to advance to compensate for the reduced thickness of the screw threads 2 by reason of wear.

The nuts 3 and 4 are moved towards each other, thereby making adjustment on both sides of the thread 2, taking up all the wear on one side of the nut threads and both sides of the screw shaft threads. The sleeve 6 is locked in position after adjustment has been made by a screw secured in the threaded opening 21 and the nut 4 may be locked by seating against the flange 14 of the sleeve support 8.

It will be readily understood from the above description of my invention that an adjustable nut made in accordance therewith provides an efficient mechanism for taking up wear on the screw and maintaining a snug-fit between the screw-and-nut members to prevent back-lash. This arrangement eliminates the frequent renewals heretofore necessary on screw-and-nut mechanisms such as are employed on mold press feed screw and the like where the screw member is in continuous operation and reverses its direction of rotation.

Although I have described a specific embodiment of my invention, it will be obvious to those skilled in the art that various modifications may be made in the details of construction thereof, as, for instance, the threaded sleeves or nuts may be of any desired length or shape, the adjusting sleeves may be likewise designed to accommodate any requirements of service and the interlocking arrangement of the members may be varied to function in any suitable manner. These and other changes may be made in the details of construction of my invention without departing from the principles herein set forth.

I claim as my invention:

1. In combination with a screw shaft, an engaging screw member comprising a plurality of nuts, a sleeve support for said nuts and a plurality of adjusting sleeves for changing the position of said nuts with respect to said shaft.

2. In combination with a screw shaft, an engaging screw member comprising a plurality of nuts, a sleeve support associated therewith and a plurality of adjusting sleeves for changing the position of said nuts with respect to said support.

3. In combination with a screw shaft, an engaging screw member comprising a plurality of nuts, a sleeve support movably associated with said nuts and a plurality of adjusting sleeves for changing the position of said nuts with respect to said shaft and support.

4. In combination with a screw shaft, an engaging screw member comprising a plurality of nuts, a sleeve support therefor and a key and keyway provided in said nuts and sleeve support and a plurality of adjusting sleeves for effecting movement of said nuts on said keyway.

5. In combination with a screw shaft, of an engaging screw member comprising a plurality of nuts, a sleeve support for said nuts and a key co-operatively engaged with keyways provided in said nuts and support, and a plurality of adjusting sleeves for effecting lateral movement of said nuts on said keyway and for preventing rotative movement thereof.

6. In combination with a screw shaft, an engaging screw member comprising a plurality of nuts, a sleeve support therefor and a plurality of adjusting sleeves for changing the position of said nuts with respect to said shaft, one of said adjusting sleeves being provided with a locking nut adapted to lock it to one end of said support.

In testimony whereof, I have hereunto subscribed my name this 26th day of January 1922.

JAMES A. BURNS.